(12) United States Patent
Bonanni et al.

(10) Patent No.: US 7,280,941 B2
(45) Date of Patent: Oct. 9, 2007

(54) METHOD AND APPARATUS FOR IN-SITU DETECTION AND ISOLATION OF AIRCRAFT ENGINE FAULTS

(75) Inventors: Pierino Gianni Bonanni, Clifton Park, NY (US); Brent Jerome Brunell, Clifton Park, NY (US)

(73) Assignee: General Electric Company, Schenectady, NY (US)

( * ) Notice: Subject to any disclaimer, the term of this patent is extended or adjusted under 35 U.S.C. 154(b) by 20 days.

(21) Appl. No.: 11/025,145

(22) Filed: Dec. 29, 2004

(65) Prior Publication Data

US 2006/0142976 A1    Jun. 29, 2006

(51) Int. Cl.
*G06F 15/00* (2006.01)
*G05B 13/02* (2006.01)

(52) U.S. Cl. .................. 702/189; 700/30; 702/185; 701/100; 714/736

(58) Field of Classification Search ............... 702/34, 702/181, 183, 189, 185; 700/30, 83; 701/13, 701/29, 100; 324/555; 714/736; 73/116; 703/2, 7

See application file for complete search history.

(56) References Cited

U.S. PATENT DOCUMENTS

| | | | |
|---|---|---|---|
| 5,233,512 A | 8/1993 | Gutz et al. ................ 700/30 |
| 5,279,107 A | 1/1994 | Meisner et al. ........... 712/239 |
| 5,566,092 A * | 10/1996 | Wang et al. ............... 702/185 |
| 5,949,678 A | 9/1999 | Wold et al. | |
| 6,073,262 A * | 6/2000 | Larkin et al. ............. 714/736 |
| 6,098,011 A | 8/2000 | Scott ........................ 701/100 |
| 6,128,555 A | 10/2000 | Hanson et al. ............. 701/13 |
| 6,292,723 B1 | 9/2001 | Brogan et al. ............. 701/29 |
| 6,389,887 B1 | 5/2002 | Dusserre-Telmon et al. .. 73/116 |
| 6,408,259 B1 | 6/2002 | Goebel et al. ............. 702/183 |

(Continued)

FOREIGN PATENT DOCUMENTS

EP    1114991    7/2001

(Continued)

OTHER PUBLICATIONS

D. Yixin et al., "Fault Diagnosis for a Turbine Engine," American Control Conference, 2000. Proceedings of the 2000, vol. 4, pp. 2393-2397.

(Continued)

*Primary Examiner*—John Barlow
*Assistant Examiner*—John H. Le
(74) *Attorney, Agent, or Firm*—GE Global Patent Operation; Mardson Q. McQuay (57) ABSTRACT

A method for performing a fault estimation based on residuals of detected signals includes determining an operating regime based on a plurality of parameters, extracting predetermined noise standard deviations of the residuals corresponding to the operating regime and scaling the residuals, calculating a magnitude of a measurement vector of the scaled residuals and comparing the magnitude to a decision threshold value, extracting an average, or mean direction and a fault level mapping for each of a plurality of fault types, based on the operating regime, calculating a projection of the measurement vector onto the average direction of each of the plurality of fault types, determining a fault type based on which projection is maximum, and mapping the projection to a continuous-valued fault level using a lookup table.

31 Claims, 5 Drawing Sheets

U.S. PATENT DOCUMENTS

| | | | | |
|---|---|---|---|---|
| 6,823,253 | B2* | 11/2004 | Brunell | 701/100 |
| 6,823,675 | B2 | 11/2004 | Brunell et al. | 60/773 |
| 6,917,839 | B2* | 7/2005 | Bickford | 700/30 |
| 2001/0042229 | A1 | 11/2001 | James | |
| 2002/0040278 | A1 | 4/2002 | Anuzis et al. | |
| 2002/0066054 | A1 | 5/2002 | Jaw et al. | |
| 2003/0065483 | A1 | 4/2003 | Ting et al. | |

FOREIGN PATENT DOCUMENTS

| | | |
|---|---|---|
| EP | 1204076 | 5/2002 |
| WO | WO 01/48571 A | 7/2001 |

OTHER PUBLICATIONS

G. Gomez et al., "A case study of physical diagnosis for aircraft engines," American Control Conference, 2000. Proceedings of the 2000, vol. 4, pp. 2383-2387.

M. J. Roemer et al., "Advanced Diagnostics and Prognostics for Gas Turbine Engine Risk Assessment," Aerospace Conference Proceedings, 2000 IEEE, Vol. 6, pp. 345-353.

T. Brotherton et al., "Prognosis of Faults in Gas Turbine Engines," Aerospace Conference Proceedings, 2000 IEEE, vol. 6, pp. 163-171.

K. Goebel et al., "Diagnostic Information Fusion: Requirements Flowdown and Interface Issues," Aerospace Conference Proceedings, 2000 IEEE, vol. 6, pp. 155-162.

L. Tarassenko et al., "Novelty Detection in Jet Engines," Condition Monitoring: Machinery, External Structures and Health (Ref. No. 1999/034), IEEE Colloquium on, 1999. pp. 4/1-4/5.

T. A. Mast et al., "Bayesian Belief Networks for Fault Identification in Aircraft GasTurbine Engines," Control Applications, 1999. Proceedings of the 1999 IEEE International Conference on, vol. 1, 1999, pp. 39-44.

G. G. Kulikov et al., "Gas Turbine Engine Fault Detection using Markov SimulationTechnique," Simulation '98. International Conference on (Conf. Publ. No. 457), 1998, pp. 69-72.

H. Y. Zhang et al., "Optimal Design Of Robust Analytical Redundancy For Uncertain Systems," Computer, Communications, Control and Power Engineering. Proceedings, TENCON '93, 1993 IEEE Region 10 Conference on Part: 40000, pp. 218-221, vol. 4.

Y. Diao et al., "Intennigent Fault Tolerant Control Using Adaptive Schemes and Multiple Models," American Control Conference, 2001, vol. 5, pp. 2854-2859.

S. K. Dassanake et al., "Using Unknown Input Observers To Detect And Isolate Sensor Faults In A Turbofan Engine," Digital Avionics Systems Conferences, 2000. DASC. The 19th, vol. 2, pp. 6.E.5-1-6.E.5-7.

R. Stobart, "Observers In Engine Control Systems: What Is The Potential?, " The Institution of Electrical Engineers, IEEE Colloquium on, 1994. pp. 5/1-5/3.

R. J. Patton et al., "A Robustness Study Of Model-Based Fault Detection For Jet Engine S ystems," Control Applications, 1992., First IEEE Conference on 1992. pp. 871-876.

B. Shafai et al., "A General Purpose Observer Architecture with Application to Failure Detection and Isolation," American Control Conference 2001. Proceedings of the 2001, vol. 2. pp. 1133-1138.

C. De Persis et al., "Nonlinear Actuator Fault Detection and Isolation for a VTOL aircraft," American Control Conference, 2001. Proceedings of the 2001. vol. 6, pp. 4449-4454.

B. Jiang et al., "Robust Observer Based Fault Diagnosis for a Class of Nonlinear Systems with Uncertainty," Decision and Control, 2001. Proceedings for the 40th IEEE Conference, vol. 1, 2001. pp. 161-166.

L. Magni et al., "A Fault Detection and Isolation Method for Complex Industrial Ssytems ," Part A, IEEE Transactions on, vol. 30 Issue: 6, Nov. 2000. pp. 860-865.

T. G. Park et al., Actuator fault estimation with disturbance decoupling, IEE Proceedings, vol. 147 No. 5, Sep. 2000, pp. 501-508.

P. Bonanni et al., "Method and System for Detecting Precursors to Compressor Stall and Surge," U.S. Appl. No. 10/065,331, filed Oct. 4, 2002.

B. Brunell et al., "Model-Based Control System and Methods for Gas Turbine Engines," U.S. Appl. No. 10/791,597, filed Mar. 2, 2004.

* cited by examiner

METHOD AND APPARATUS FOR IN-SITU DETECTION AND ISOLATION OF AIRCRAFT ENGINE FAULTS

STATEMENT REGARDING FEDERALLY SPONSORED RESEARCH & DEVELOPMENT

This invention was made with Government support under contract number NAS3-01135 awarded by the National Aeronautics and Space Administration (NASA). The Government has certain rights in the invention.

BACKGROUND OF THE INVENTION

This invention relates to detecting and classifying faults in an operating machine, and more particularly to detecting and classifying faults in an operating aircraft engine using an Extended Kalman Filter architecture.

Aircraft engines must maintain the highest achievable levels of reliability, because of their extreme safety-critical nature and because the vehicles powered by these engines represent enormous investments in resources. However, as with all machinery, small component failures and other operating faults may occur, owing to material failures, environmental disturbances, and normal deterioration during the operating life of an aircraft engine.

Having faults go undetected and without compensating control actions can risk further damage and may accelerate deterioration, leading to higher safety risks. Similarly, when engine faults are detected by imprecise means and with high levels of uncertainty, operators are often obliged to take the most conservative measures, which typically involve aborting a takeoff or shutting down an engine during flight. Since these measures in themselves pose some risk to the aircraft and its occupants, it is important to be able to distinguish small faults for which more timely and less extreme measures can safely be taken.

Current engine health monitoring schemes detect only large faults and failures of the sensors, actuators, and control hardware. The architecture of the engine controls is based either in dual-redundant or tri-redundant hardware. Much of the diagnostic logic depends on comparing the redundant sensors to each other or to simple static models of the sensor. There is no systematic procedure for taking into account the behavior of the overall system by using a system model in concert with all of the available sensors. This causes current methods to be unable to detect faults until they reach a relatively large magnitude. Current monitoring also detects undesired and potentially damaging engine events like stalls and surges, but does not try to isolate the cause of the event.

SUMMARY OF THE INVENTION

An exemplary embodiment of the present invention includes a method for performing fault estimation based on residuals of detected signals, the method including comparing the detected signals with estimates of the detected signals, based on an extended Kalman filter, and outputting the residuals; and determining a fault type and a fault level by performing hypothesis testing on the residuals.

In another exemplary embodiment of the present invention, there is a method for performing a fault estimation based on residuals of detected signals, including: determining an operating regime based on a plurality of parameters; extracting predetermined noise standard deviations of the residuals corresponding to the operating regime and scaling the residuals; calculating a magnitude of a measurement vector of the scaled residuals and comparing the magnitude to a decision threshold value; extracting a mean direction and a fault level mapping for each of a plurality of fault types, based on the operating regime; calculating a projection of the measurement vector onto the mean direction of each of the plurality of fault types; determining a fault type based on which projection is maximum; and mapping the projection to a continuous-valued fault level using a lookup table.

In an additional exemplary embodiment of the present invention, there is a computer program product for enabling a computer to implement operations for performing a fault estimation based on residuals of detected signals, the computer program product comprising a computer readable medium and instructions on the computer readable medium, the operations including: determining an operating regime based on a plurality of parameters; extracting predetermined noise standard deviations of the residuals corresponding to the operating regime and scaling the residuals; calculating a magnitude of a measurement vector of the scaled residuals and comparing the magnitude to a decision threshold value; extracting a mean direction and a fault level mapping for each of a plurality of fault types, based on the operating regime; calculating a projection of the measurement vector onto the mean direction of each of the plurality of fault types; determining a fault type based on which projection is maximum; and mapping the projection to a continuous-valued fault level using a lookup table.

In another exemplary embodiment of the present invention, there is a method for detecting and isolating faults in a system, including: detecting a plurality of signals; determining a residual of each of the plurality of signals; determining an operating regime based on a plurality of parameters; extracting predetermined noise standard deviations of the residuals corresponding to the operating regime and scaling the residuals; calculating a magnitude of a measurement vector of the scaled residuals and comparing the magnitude to a decision threshold value; extracting a mean direction and a fault level mapping for each of a plurality of fault types, based on the operating regime; calculating a projection of the measurement vector onto the mean direction of each of the plurality of fault types; determining a fault type based on which projection is maximum; and mapping the projection to a continuous-valued fault level using a lookup table. In a further exemplary embodiment of the present invention, there is a computer program product for enabling a computer to implement operations for detecting and isolating faults in a system based on residuals of detected signals, the computer program product comprising a computer readable medium and instructions on the computer readable medium, the operations including: detecting a plurality of signals; determining a residual of each of the plurality of signals; determining an operating regime based on a plurality of parameters; extracting predetermined noise standard deviations of the residuals corresponding to the operating regime and scaling the residuals; calculating a magnitude of a measurement vector of the scaled residuals and comparing the magnitude to a decision threshold value; extracting a mean direction and a fault level mapping for each of a plurality of fault types, based on the operating regime; calculating a projection of the measurement vector onto the mean direction of each of the plurality of fault types; determining a fault type based on which projection is maximum; and mapping the projection to a continuous-valued fault level using a lookup table.

In an additional exemplary embodiment of the present invention, there is an apparatus for detecting and isolating faults in a system based on residuals of detected signals, the apparatus including: a processor configured to determine an operating regime based on a plurality of parameters; extract predetermined noise standard deviations of the residuals corresponding to the operating regime and scale the residuals; calculate a magnitude of a measurement vector of the scaled residuals and compare the magnitude to a decision threshold: value; extract a mean direction and a fault level mapping for each of a plurality of fault types, based on the operating regime; calculate a projection of the measurement vector onto the mean direction of each of the plurality of fault types; determine a fault type based on which projection is maximum; and map the projection to a continuous-valued fault level using a lookup table.

In another exemplary embodiment of the present invention is a system for detecting and isolating faults based on residuals of detected signals, the system including: a detector which detects the detected signals; an extended Kalman filter which compares the detected signals with estimates of the detected signals and outputs a plurality of residuals; and a processor which performs hypothesis testing on the residuals to determine a fault type and a fault level.

In another exemplary embodiment of the present invention, there is a system for detecting and isolating faults based on residuals of detected signals, the system including: a detector which detects the detected signals; an extended Kalman filter which compares the detected signals with estimates of the detected signals and outputs a plurality of residuals; and a processor configured to determine an operating regime based on a plurality of parameters; extract predetermined noise standard deviations of the residuals corresponding to the operating regime and scale the residuals; calculate a magnitude of a measurement vector of the scaled residuals and compare the magnitude to a decision threshold value; extract a mean direction and a fault level mapping for each of a plurality of fault types, based on the operating regime; calculate a projection of the measurement vector onto the mean direction of each of the plurality of fault types; determine a fault type based on which projection is maximum; and map the projection to a continuous-valued fault level using a lookup table.

BRIEF DESCRIPTION OF THE DRAWINGS

The advantages, nature and various additional features of the invention will appear more fully upon consideration of the illustrative embodiments of the invention which are schematically set forth in the figures, in which.

DETAILED DESCRIPTION OF THE INVENTION

The present invention will be explained in further detail by making reference to the accompanying drawings, which do not limit the scope of the invention in any way.

Modern aircraft engines employ full-authority digital controls, which make use of sensors deployed throughout the engine. This invention describes how these same sensor measurements can be used to monitor the health of the engine, including its actuators and the sensors themselves. By using a system model with available sensors, this invention is able to isolate the cause of the engine event when it occurs. Moreover, this invention is able to distinguish small faults from large faults. Along with the safety advantages of being able to distinguish small faults from larger faults, the ability to detect small faults early enables more timely engine maintenance, which reduces costs and extends the operating life of the engine.

The invention will now be taught using various exemplary embodiments. Although the embodiments are described in detail, it will be appreciated that the invention is not limited to just these embodiments, but has a scope that is significantly broader. The appended claims should be consulted to determine the true scope of the invention. Prior to describing the embodiments in detail, however, the meaning of certain terms will be explained.

One embodiment of this invention resides in a computer system. Here, the term "computer system" is to be understood to include at least a memory and a processor. In general, the memory will store, at one time or another, at least portions of an executable program code, and the processor will execute one or more of the instructions included in that executable program code. It will be appreciated that the terms "executable program code," "software," and "instructions" mean substantially the same thing for the purposes of this description. It is not necessary to the practice of this invention that the memory and the processor be physically located in the same place. That is to say, it is foreseen that the processor and the memory might be in different physical pieces of equipment or even in geographically distinct locations.

The above-identified invention may be embodied in a computer program product, as will now be explained. On a practical level, the software that enables the computer system to perform the operations described in detail further below may be supplied on any of a variety of media. Furthermore, the actual implementation of the approach and operations of the invention may actually be statements in a computer language. Such computer language statements, when executed by a computer, cause the computer to act in accordance with the particular content of the statements. Furthermore, the software that enables a computer system to act in accordance with the invention may be provided in any number of forms including, but not limited to, original source code, assembly code, object code, machine language, compressed or encrypted versions of the foregoing, and any and all equivalents now known or hereafter developed.

One familiar with this field will appreciate that "media", or "computer-readable media", as used here, may include a diskette, a tape, a compact disc, an integrated circuit, a ROM, a CD/DVD, a cartridge, a memory stick or card, a remote transmission via a communications circuit, or any other medium useable by computers, including those now known or hereafter developed. For example, to supply software for enabling a computer system to operate in accordance with the invention, the supplier might provide a disc or might transmit the software in some form via satellite transmission, via a direct wired or a wireless link, or via the Internet. Thus, the term, "computer readable medium" is intended to include all of the foregoing and any other medium by which software may be provided to a processor.

Although the enabling software/code/instructions might be "written on" a disc, "embodied in" an integrated circuit, or "carried over" a communications circuit, it will be appreciated that, for the purposes of this discussion, the software will be referred to simply as being "on" the computer readable medium. Thus, the term "on" is intended to encompass the above mentioned and all equivalent and possible ways in which software can be associated with a computer readable medium.

For the sake of simplicity, therefore, the term "program product" is thus used to refer to a computer readable medium, as defined above, which has on it any form of software to enable a computer system to operate according to any embodiment of the invention.

Having explained the meaning of various terms, the invention will now be described in detail, in the context of a method.

Figure 1:
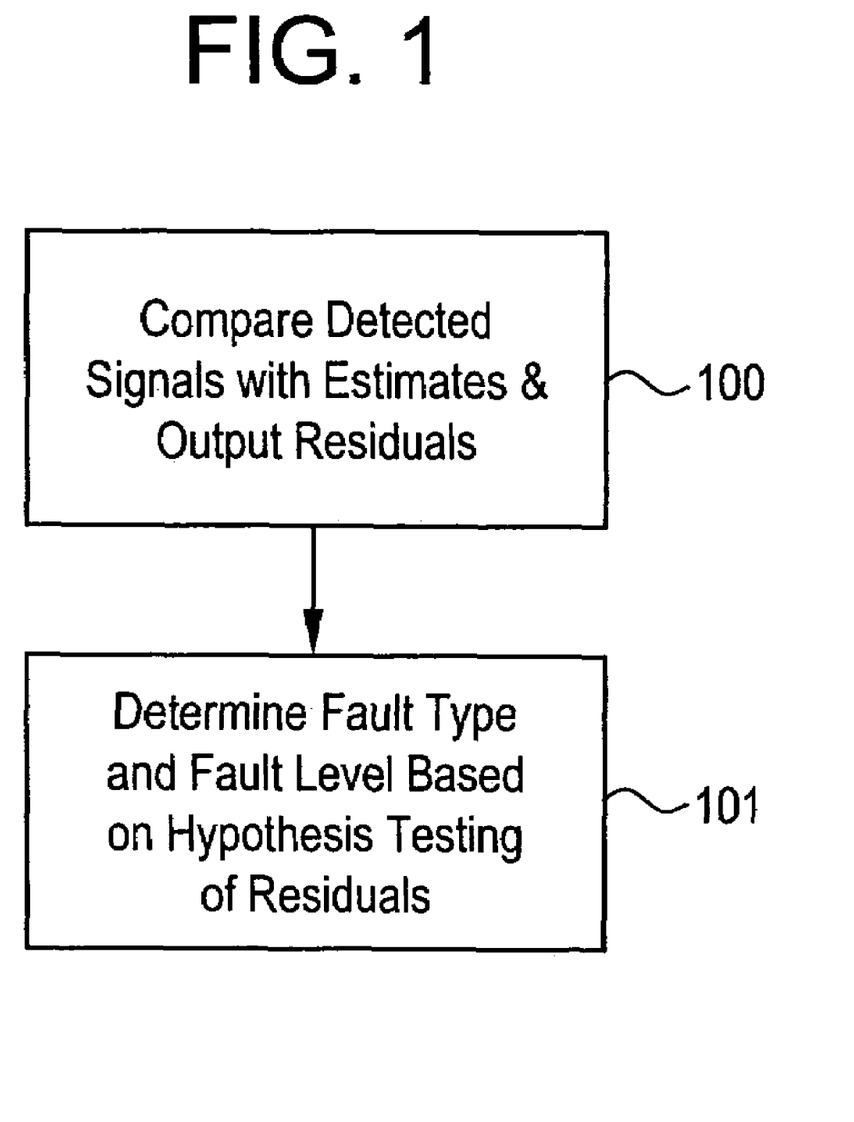
FIG. 1 is a diagrammatical representation of a method for performing fault estimation based on residuals of detected signals according to an embodiment of the present invention.

In an exemplary embodiment of the invention, there is a method for performing fault estimation based on residuals of detected signals. As illustrated in FIG. 1, the method includes: comparing the detected signals with estimates of the detected signals, based on an extended Kalman filter (EKF), and outputting the residuals (step 100); and determining a fault type and a fault level by performing hypothesis testing on the residuals (step 101). Examples of the detected signals correspond to actual sensor measurements. The EKF compares actual sensor measurements to estimates provided by an internal model and outputs error signals, i.e., residuals. The EKF is described in the following references: Athans, M. (1996), *The Control Handbook*, pp. 589-594, CRC Press, United States and Anderson, B. D. O., Moore, J. B., *Optimal Filtering*, Prentice-Hall, Englewood Cliffs N.J., 1979.

Prior to operation of the exemplary embodiments of the method for performing fault estimation, a training process is implemented in which an estimator is trained offline. An engine model is used in the training process to determine the noise variances and the final values of the residuals for each of the representative fault types and levels, including the no-fault case. To account for variation in engine behavior over the flight envelope, which may be defined by ambient temperature, altitude, mach number, and thrust level, the domain of possible variation in the flight envelope parameters is divided into representative regimes. The final values of the sensor residuals are logged for each of these regimes by averaging over all test cases pertaining to a particular regime. The sensor noise variance is similarly segregated by regime. However, the noise is assumed to be independent of the faults. Thus, the computation of the standard deviations is performed only on the no-fault training data, after segregating the data by regime.

The training process enables computing the noise standard deviations, the mean directions for faults, the mappings between fault levels and vector magnitudes, and the assignment of a decision threshold value. In an exemplary embodiment, the fault level mappings are stored in a lookup table, based upon the operating regimes. The training process is repeated for each sensor, for each fault type, and for each regime comprising the flight envelope.

In an exemplary embodiment of the invention, the foregoing method is implemented in an aircraft to detect and isolate errors in the aircraft engine and its associated actuators and sensors. For an engine operating normally, the residuals are small and contain only measurement noise. When a fault occurs, the residuals respond in a manner systematic to the type and severity of the fault. The type of fault and the level of the fault are determined by performing hypothesis testing on the residuals. For example, a Bayesian Hypothesis Test may be performed, in which the likelihoods of various predefined fault types are assessed given the current residuals. A decision on the fault type is made, which is followed by a correlation computation to determine the fault level or severity.

In the Bayesian Hypothesis Testing, the various fault types and levels, as well as the no-fault condition, are expressed in terms of their signatures in a measurement space defined by the scaled EKF residuals, where the scaling is performed by dividing each residual by the standard deviation of that signal's noise level. This space is of dimension p, where p is the number of sensors. The values attained by the residuals when the various fault conditions are imposed are thus represented as positions in the space, and these positions are compared to real-time measurements to asses the health of the engine. Bayesian Hypothesis Testing is described in the following reference: Van Trees, H. L., *Detection, Estimation, and Modulation Theory*, John Wiley & Sons, N.Y., 1968 (Sections 2.1 thru 2.4).

Because the sensors are subjected to noise and unknown biases, the fault conditions give rise not to discrete positions in the measurement space, but rather to probabilistic distributions in the space. More precisely, these are conditional probability functions defined on the p-dimensional space, given the various fault hypotheses. If the sensor noise is considered to be Gaussian and white, the fault hypotheses may be represented as ellipsoidal functions centered on various mean positions in the space, with the axes of the ellipsoid sized according to the noise variance in each dimension. When the noise is independent across sensors, it is customary to normalize the dimensions of the measurement space by the standard deviation of the corresponding sensor noise, so that the ellipsoidal probability density functions degenerate to spherical functions of uniform radius. Further, in the absence of a priori knowledge of engine faults, the various fault hypotheses are assumed to be equally likely over a given time interval. Under these assumptions, the implementation of an optimal Bayesian Hypothesis test that minimizes the probability of error (false positives, false negatives, and misclassifications) is accomplished by means of a simple distance computation between the real-time residuals and the p-dimensional reference hypotheses, after dividing each residual by the standard deviation of the sensor noise. This is because the conditional probabilities are represented directly by distance, in the standard Euclidian sense, within the normalized measurement space.

In another exemplary embodiment of the present invention, there is a computer program product for enabling a computer to implement the operations for performing fault estimation based on residuals of detected signals, the computer program product comprising a computer readable medium and instructions on the computer readable medium, the operations including: comparing the detected signals with estimates of the detected signals, based on an extended Kalman filter (EKF), and outputting the residuals (step 100); and determining a fault type and a fault level by performing hypothesis testing on the residuals (step 101), as described above in relation to FIG. 1.

Figure 2:
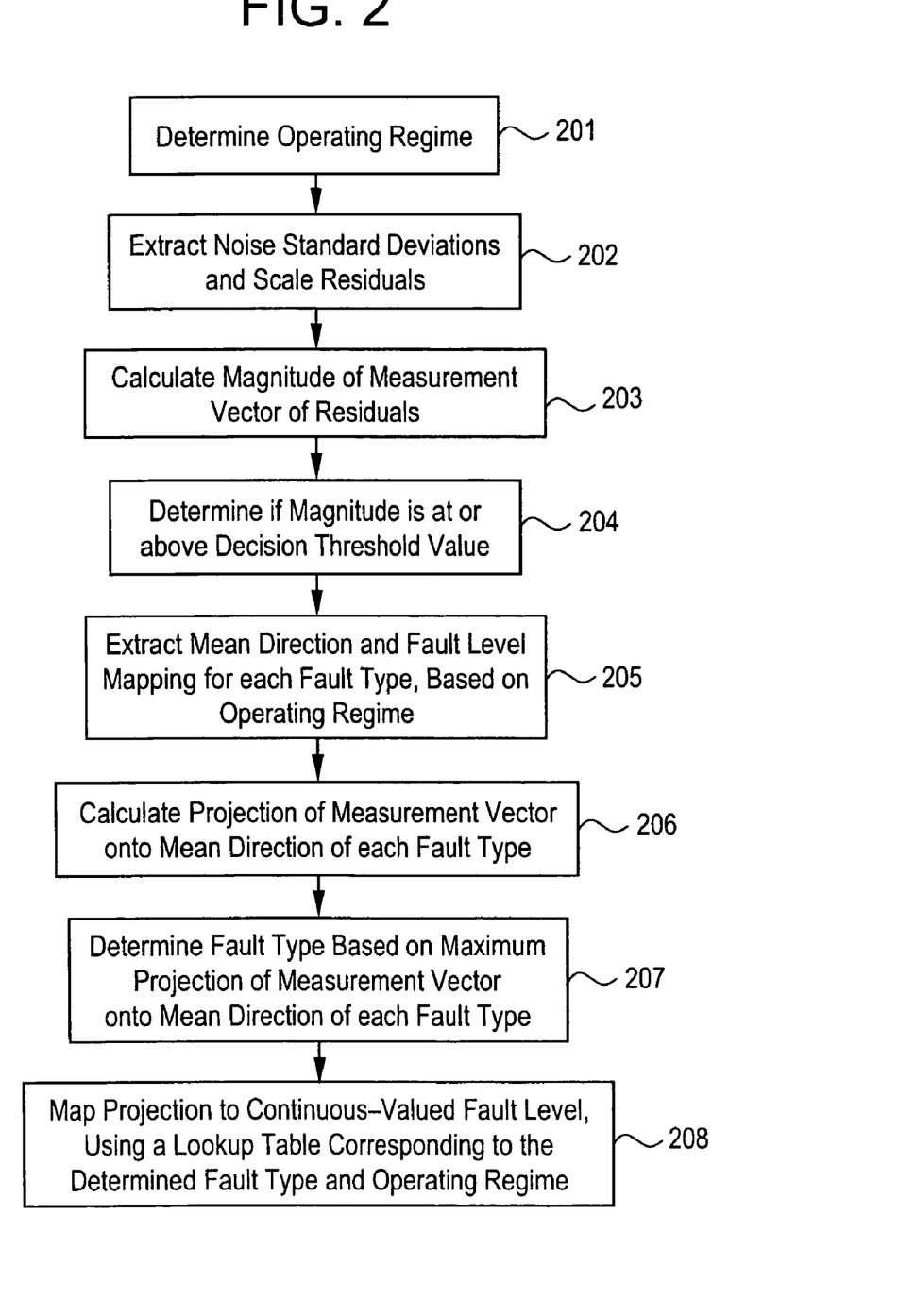
FIG. 2 is a diagrammatical representation of a method for performing fault estimation based on residuals of detected signals according to another embodiment of the present invention.
Figure 5:
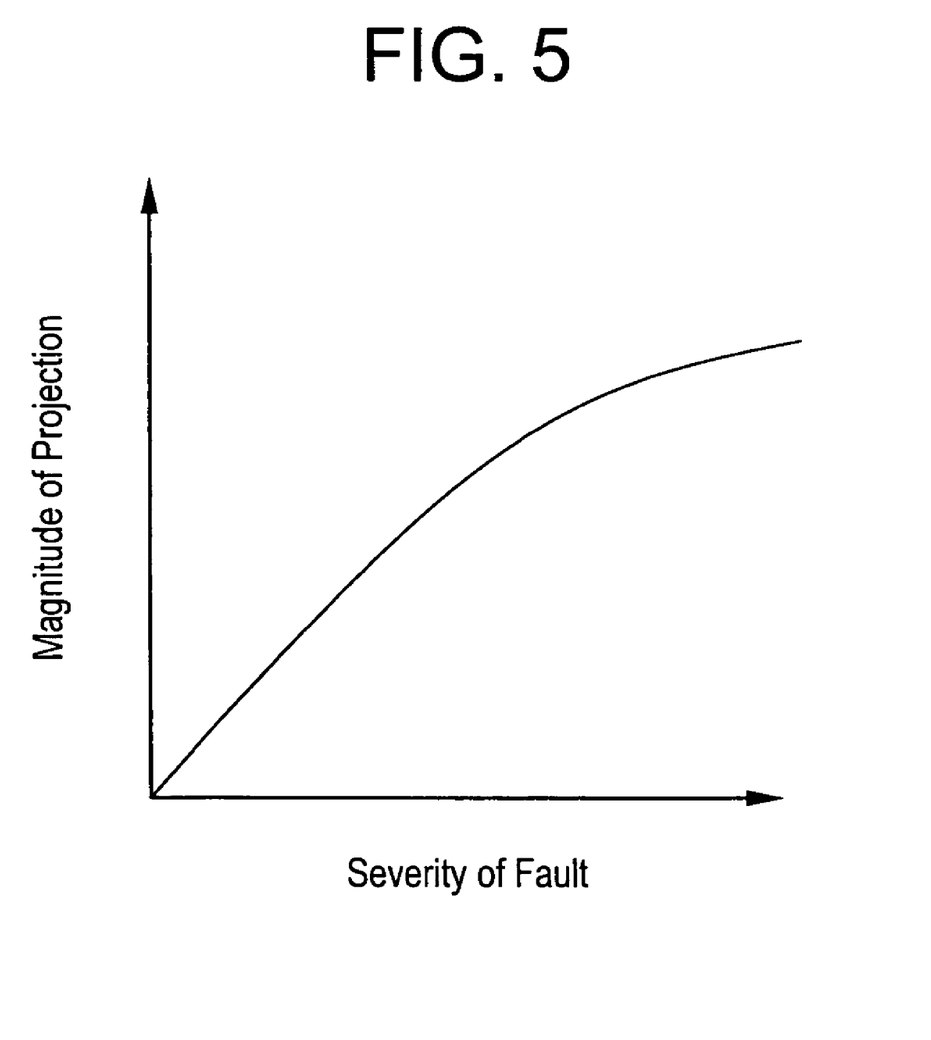
FIG. 5 is a diagrammatical representation of data provided by an operating regime lookup table.

FIG. 2 illustrates an exemplary embodiment of the present invention, in which there is a method for performing a fault estimation based on residuals of detected signals. This method includes: determining an operating regime from a plurality of parameters (step 201); extracting predetermined noise standard deviations of the residuals corresponding to the operating regime and scaling the residuals (step 202); calculating a magnitude of a measurement vector of the scaled residuals (step 203); determining if the magnitude is at or above the decision threshold value (step 204); extracting a mean direction and a fault level mapping for each of a plurality of fault types, based on the operating regime (step 205); calculating a projection of the measurement vector onto the mean direction of each of the plurality of fault types (step 206); determining a fault type based on which projection is maximum (step 207); and mapping the projection to a continuous-valued fault level using a lookup table (step 208). An example of data that can be provided in an operating regime lookup table is illustrated in FIG. 5, which depicts the magnitude of a projection versus severity of fault. However, the operating regime lookup table and the data therein are not limited to the illustration in FIG. 5.

The detected signals may include any or all of actuator signals, sensor signals and engine signals.

In step 201, an operating regime is determined from a plurality of parameters.

In step 202, predetermined noise standard deviations of the residuals are extracted from a source of data, i.e., a lookup table, for example, and the residuals are scaled. In an exemplary embodiment, the scaling includes normalizing the residuals.

In step 203, the magnitude of the measurement vector of the residuals is calculated. The measurement vector may be determined by dividing each residual by a noise standard deviation. This magnitude is compared to the decision threshold value, which is a predetermined value. The selection of the decision threshold value is based upon a balance between the false alarm rate and the fault detection rate. Too low a decision threshold value increases the false alarm rate, while too high a decision threshold value increases the likelihood that actual faults will go undetected.

In step 204, it is determined whether the magnitude is at or above the decision threshold value. If it is determined that the magnitude is below the decision threshold value, it is determined that there is no fault. The operating regime represents one of a plurality of possible portions of the region in which a signal may be present. The parameters used to determine the operating regime may include flight envelope parameters. For example, the flight envelope parameters may include, but are not limited to ambient temperature, altitude, mach number, and thrust level.

After it is determined that there is a fault of some type, a mean direction and a fault level mapping are extracted for each of the plurality of fault types based on the operating regime, in step 205. The fault types may include, but are not limited to, one or more of a sensor fault, an actuator fault, a first machine fault, and a second machine fault. The mean directions are unit vectors approximating the contours defined by the end values of the residuals, which can be used in a correlation computation to determine the fault type. In an exemplary embodiment, the mean direction for each fault type includes a set of p-dimensional vectors, where p represents a number of sensors. The fault level mapping may be determined via a lookup table that associates fault levels with length along the appropriate fault contour.

In step 206, a calculation of a projection of the measurement vector onto the mean direction of each of the plurality of fault types is performed. Based on a maximum projection of the measurement vector onto the mean direction of each of the plurality of fault types (step 207), the fault type is determined.

For the determined fault type, the projection is mapped to a continuous-valued fault level, using a lookup table (step 208). The continuous values may be obtained by interpolating or extrapolating from predetermined fault levels.

Figure 3:
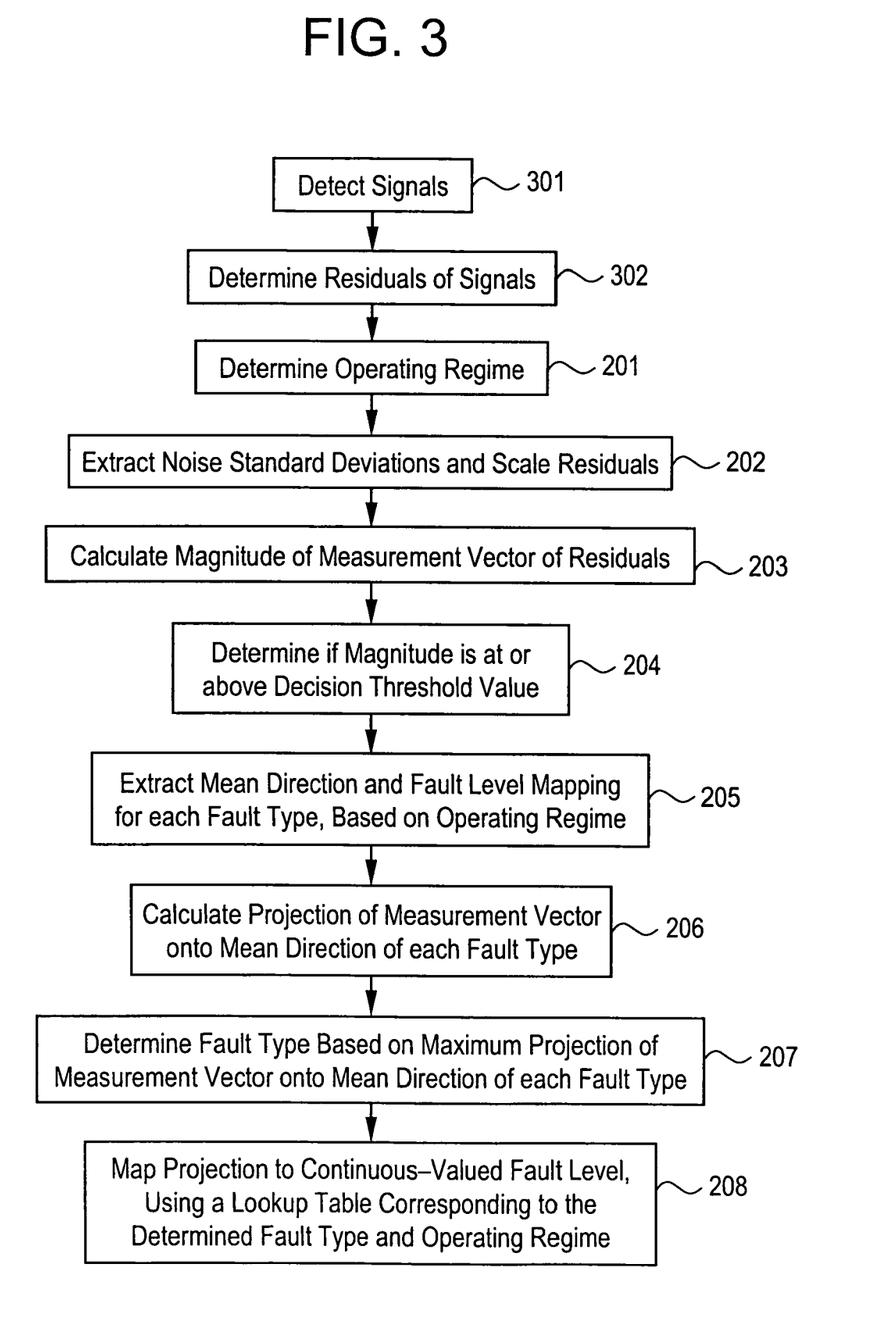
FIG. 3 is a diagrammatical representation of a method for detecting and isolating faults in a system according to an embodiment of the present invention.

FIG. 3 illustrates a method for detecting and isolating faults in a system. The method illustrated in FIG. 3 corresponds to the method illustrated in FIG. 2, but further includes the steps of detecting signals (step 301) and determining the residuals of the detected signals (step 302). Once steps 301 and 302 are performed, the method of FIG. 3 follows the method illustrated in FIG. 2. Since the method of FIG. 2 is described above, the description of these steps is not repeated here.

In another exemplary embodiment of the present invention, there is a computer program product for enabling a computer to implement operations for detecting and isolating faults in a system based on residuals of detected signals, the computer program product including a computer readable medium and instructions on the computer readable medium, the operations including: detecting signals (step 301); determining residuals of the detected signals (step 302); determining an operating regime from a plurality of parameters (step 201); extracting predetermined noise standard deviations of the residuals corresponding to the operating regime and scaling the residuals (step 202); calculating a magnitude of a measurement vector of the scaled residuals (step 203); determining if the magnitude is at or above the threshold value (step 204); extracting a mean direction and a fault level mapping for each of a plurality of fault types, based on the operating regime (step 205); calculating a projection of the measurement vector onto the mean direction of each of the plurality of fault types (step 206); determining a fault type based on which projection is maximum (step 207); and mapping the projection to a continuous-valued fault level using a lookup table (step 208). Since these steps are described above, the description is not repeated here.

Figure 4:
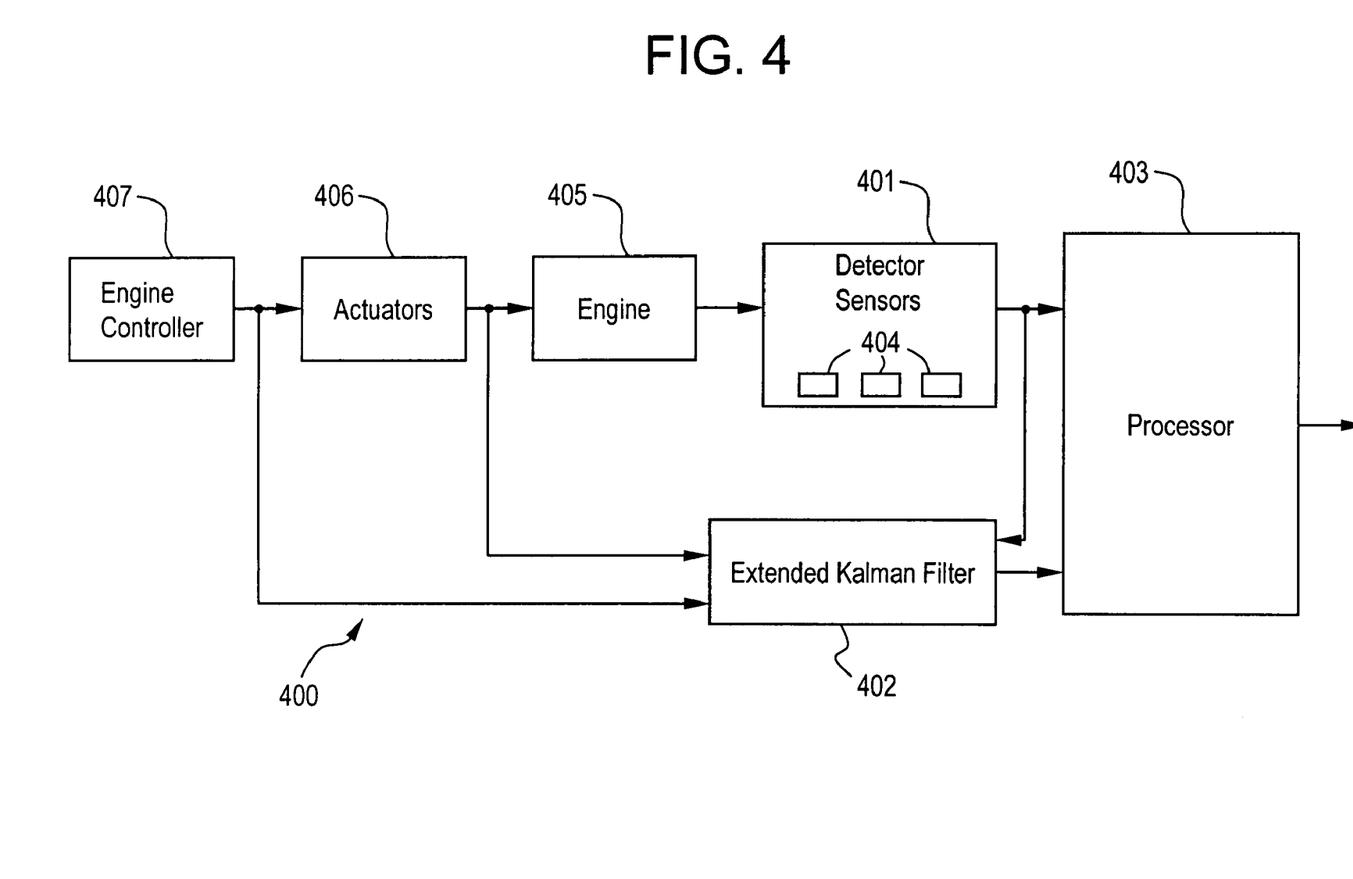
FIG. 4 is a diagrammatical representation of a system for detecting and isolating faults based on residuals of detected signals, according to an embodiment of the present invention.

FIG. 4 illustrates a block diagram of a system for detecting and isolating faults based on residuals of detected signals, according to an embodiment of the present invention. As shown in FIG. 4, the system 400 includes a detector 401 which detects signals; an extended Kalman filter 402 which compares the detected signals with estimates of the detected signals and outputs a plurality of residuals; and a processor 403 which performs hypothesis testing on the residuals to determine a fault type and a fault level. The processor 403 may be configured to operate in real time, i.e., during the operation of the system, without introducing a delay into the operation of the system. Also, the hypothesis testing may be Bayesian Hypothesis Testing.

The detector 401 may include a plurality of sensors 404, which are disposed in predetermined locations throughout the system 400. The sensors 404 are configured to monitor a machine, which, in the present embodiment, is an aircraft engine 405. In a particular embodiment, sensors 404 are disposed on the machine. Sensors 404 may also be configured to monitor the actuators 406 or other subsystems within the system 400. In particular embodiments, sensors 404 are disposed on the actuators or other subsystems. The engine controller 407 of FIG. 4 provides control signals to actuators 406, which control operations of the engine 405.

In an exemplary embodiment of the present invention, the processor 403 is configured to calculate a magnitude of a measurement vector of the residuals and compare the magnitude to a decision threshold value; determine an operating regime based on a plurality of parameters; extract a mean direction and a fault level mapping for each of a plurality of fault types, based on the operating regime; calculate a projection of the measurement vector onto the mean direction of each of the plurality of fault types; determine a fault type based on which projection is maximum; and map the projection to a continuous-valued fault level using a lookup table. These operations of the processor are described above in relation to FIG. 2.

While the invention has been described in terms of specific embodiments, those skilled in the art will recognize that the invention can be practiced with modification within the spirit and scope of the claims. Namely, although the present invention has been discussed in the context of aircraft engine applications, it is contemplated that the present invention can be employed in all applications in which faults of a machine are detected and classified.

What is claimed is:

1. A method for performing a fault estimation based on a plurality of residuals of a plurality of detected signals from a machine, comprising:
   determining an operating regime based on a plurality of parameters;
   extracting predetermined noise standard deviations of said residuals corresponding to said operating regime and scaling said residuals;
   calculating a magnitude of a measurement vector of said scaled residuals and comparing said magnitude to a decision threshold value;
   extracting a mean direction and a fault level mapping for each of a plurality of fault types, based on said operating regime;
   calculating a protection of said measurement vector onto said mean direction of each of said plurality of fault types;
   determining a fault type based on a maximum projection of said measurement vector onto said mean direction of each of said plurality of fault types; and
   mapping said projection to a continuous-valued fault level using a lookup table, wherein said calculating the magnitude of the measurement vector and comparing the same to the decision threshold value, determining the fault type based on the maximum projection of the measurement vector, and mapping said projection to the continuous-valued fault level are provided for subsequent use in performing said fault estimation of the machine.

2. The method of claim 1, wherein, if said magnitude is below said decision threshold value, it is determined that there is no fault.

3. The method of claim 1, wherein said parameters comprise flight envelope parameters.

4. The method of claim 1, wherein said scaling comprises normalizing said residuals by dividing said residuals by said noise standard deviations.

5. The method of claim 1, further comprising correlating said measurement vector with said mean direction of each of said plurality of fault types.

6. The method of claim 1, wherein said residuals comprise extended Kalman filter residuals.

7. The method of claim 1, wherein said detected signals comprise at least one of actuator signals, sensor signals, and engine signals.

8. The method of claim 1, wherein said detected signals comprise actuator signals, sensor signals, and engine signals.

9. The method of claim 1, wherein said fault types comprise at least one of a sensor fault, an actuator fault, a first machine fault and a second machine fault.

10. The method of claim 1, wherein said fault types comprise a sensor fault, an actuator fault, a first machine fault and a second machine fault.

11. The method of claim 1, wherein said mean direction for each fault type comprises a set of p-dimensional vectors, where p represents a number of sensors.

12. A computer program product for enabling a computer to implement operations for performing a fault estimation based on a plurality of residuals of a plurality of detected signals from a machine, the computer program product comprising a computer readable medium and instructions on the computer readable medium, the operations comprising:
   determining an operating regime based on a plurality of parameters;
   extracting predetermined noise standard deviations of said residuals corresponding to said operating regime and scaling said residuals;
   calculating a magnitude of a measurement vector of said scaled residuals and comparing said magnitude to a decision threshold value;
   extracting a mean direction and a fault level mapping for each of a plurality of fault types, based on said operating regime;
   calculating a projection of said measurement vector onto said mean direction of each of said plurality of fault types;
   determining a fault type based on a maximum projection of said measurement vector onto said mean direction of each of said plurality of fault types; and
   mapping said projection to a continuous-valued fault level using a lookup table, wherein said calculating the magnitude of the measurement vector and comparing the same to the decision threshold value, determining the fault type based on the maximum projection of the measurement vector, and mapping said projection to the continuous-valued fault level are provided for subsequent use in performing said fault estimation of the machine.

13. The computer program product of claim 12, wherein, if said magnitude is below said decision threshold value, it is determined that there is no fault.

14. The computer program product of claim 12, wherein said parameters comprise flight envelope parameters, wherein said detected signals comprise at least one of actuator signals, sensor signals, and engine signals, and said system comprises an engine, wherein said fault types comprise at least one of a sensor fault, an actuator fault, a first machine fault and a second machine fault.

15. The computer program product of claim 12, wherein said scaling comprises normalizing said residuals by dividing said residuals by said noise standard deviations, and wherein said residuals comprise extended Kalman filter residuals.

16. The computer program product of claim 12, wherein the operations further comprise:
   detecting a plurality of signals; and
   determining a residual of each of said plurality of signals, and
   wherein the fault estimation is performed for a system that includes an aircraft engine.

17. A method for detecting and isolating faults in a system, comprising:
   detecting a plurality of signals;
   determining a residual of each of said plurality of signals;

determining an operating regime based on a plurality of parameters;

extracting predetermined noise standard deviations of said residuals corresponding to said operating regime and scaling said residuals;

calculating a magnitude of a measurement vector of said scaled residuals and comparing said magnitude to a decision threshold value;

extracting a mean direction and a fault level mapping for each of a plurality of fault types, based on said operating regime;

calculating a projection of said measurement vector onto said mean direction of each of said plurality of fault types, determining a fault type based on a maximum projection of said measurement vector onto said mean direction of each of said plurality of fault types; and mapping said projection to a continuous-valued fault level using a lookup table wherein said calculating the magnitude of the measurement vector and comparing the same to the decision threshold value, determining the fault type based on the maximum projection of the measurement vector, and mapping said projection to the continuous-valued fault level are provided for subsequent use in performing said fault estimation of the machine.

18. The method of claim 17, further comprising correlating said measurement vector with said mean direction of each of said plurality of fault types;

wherein said measurement vector is determined by dividing each residual by a noise standard deviation;

wherein said residuals comprise extended Kalman filter residuals; and wherein, if said magnitude is below said decision threshold value, it is determined that there is no fault.

19. The method of claim 17, wherein said parameters comprise flight envelope parameters, wherein said detected signals comprise at least one of actuator signals, sensor signals, and engine signals, and said system comprises an engine, wherein said fault types comprise at least one of a sensor fault, an actuator fault, a first machine fault and a second machine fault, and wherein said system comprises an aircraft engine.

20. An apparatus for detecting and isolating faults in a system based on a plurality of residuals of a plurality of detected signals from the system, said apparatus comprising:

a processor configured to determine an operating regime based on a plurality of parameters, extract predetermined noise standard deviations of said residuals corresponding to said operating regime and scale said residuals, calculate a magnitude of a measurement vector of said scaled residuals and compare said magnitude to a decision threshold value, extract a mean direction and a fault level mapping for each of a plurality of fault types, based on said operating regime, calculate a projector of said measurement vector onto said mean direction of each of said plurality of fault types, determine a fault type based on a maximum projection of said measurement vector onto said mean direction of each of said plurality of fault types and map said projection to a continuous-valued fault level using a lookup table, wherein the processor is configured to calculate the magnitude of the measurement vector and compare the same to the decision threshold value, determine the fault type based on the maximum projection of the measurement vector, and map said projection to the continuous-valued fault level for subsequent use in detecting and isolating the faults in the system.

21. The apparatus of claim 20, wherein said processor is configured to operate in real time.

22. The apparatus of claim 20, wherein said apparatus is disposed in an aircraft and said system comprises an aircraft engine.

23. The apparatus of claim 20, wherein said processor comprises an aircraft engine controller.

24. The apparatus of claim 20, wherein said apparatus is configured to detect and isolate faults in a plurality of actuators, a plurality of sensors, and an engine.

25. A system for detecting and isolating faults based on a plurality of residuals of a plurality of detected signals, said system comprising:

a detector which detects said detected signals;

an extended Kalman filter which compares said detected signals with estimates of said detected signals and outputs a plurality of residuals; and a processor which performs hypothesis testing on said residuals to determine a fault type and a fault level, wherein said processor is configured to determine an operating regime based on a plurality of parameters, extract predetermined noise standard deviations of said residuals corresponding to said operating regime and scale said residuals, calculate a magnitude of a measurement vector of said scaled residuals and compare said magnitude to a decision threshold value, extract a mean direction and a fault level mapping for each of a plurality of fault types, based on said operating regime, calculate a projection of said measurement vetcor onto said mean direction of each of said plurality of fault types, determine a fault type based on a maximum projection of said measurement vector onto said mean direction of each of said plurality of fault types, and map said projection to a continuous-valued fault level using a lookup table.

26. The system of claim 25, wherein said detector comprises a plurality of sensors.

27. The system of claim 25, wherein said hypothesis testing comprises Bayesian hypothesis testing.

28. The system of claim 25, wherein said processor is configured to operate in real time.

29. The system of claim 25, wherein said processor comprises an aircraft engine controller and is disposed in an aircraft and said system comprises an aircraft engine, and wherein said system is configured to detect and isolate faults in a plurality of actuators, a plurality of sensors, and an engine.

30. A method for performing fault estimation based on a plurality of residuals of a plurality of detected signals from a machine, said method comprising:

comparing said detected signals with estimates of said detected signals, based on an extended Kalman filter, and outputting said residuals; and determining a fault type and a fault level by performing hypothesis testing on said residuals, said determining further comprises determining an operating regime based on a plurality of parameters, extracting predetermined noise standard deviations of said residuals corresponding to said operating regime and scale said residuals, calculating a magnitude of a measurement vector of said scaled residuals and compare said magnitude to a decision threshold value, extracting a mean direction and a fault level mapping for each of a plurality of fault types, based on said operating regime, calculating a projection of said measurement vetcor onto said mean direction of each of said plurality of fault types, determining a fault type based on a maximum projection of said measurement vector onto said mean direction of each of said plurality of fault types, and mapping said projection to a continuous-valued fault level using a lookup table, wherein said calculating the magnitude of the measurement vector and comparing the same to the decision threshold value, determining the fault type based on the maximum projection of the measurement vector, and mapping said projection to the continuous-valued fault level are provided for subsequent use in performing said fault estimation of the machine.

31. The method of claim 30, wherein said hypothesis testing comprises Bayesian hypothesis testing.

* * * * *